United States Patent [19]

Long

[11] Patent Number: 5,028,328

[45] Date of Patent: Jul. 2, 1991

[54] CONTROLLED PORE SIZE COFFEE FILTER

[76] Inventor: Joseph F. Long, 1335 Lost Creek Blvd., Austin, Tex. 78746

[21] Appl. No.: 443,598

[22] Filed: Nov. 30, 1989

[51] Int. Cl.⁵ .............................................. B01D 35/28
[52] U.S. Cl. .................................. 210/477; 210/497.3; 99/295; 426/77
[58] Field of Search ............... 210/473, 474, 477, 482, 210/497.3, 498, 499; 99/295, 306; 426/77

[56] References Cited

U.S. PATENT DOCUMENTS 3,935,112  1/1976  Greutert ............................ 210/456
3,943,058  3/1976  Wurm ................................ 210/482

Primary Examiner—Robert A. Dawson
Assistant Examiner—Wanda L. Millard
Attorney, Agent, or Firm—Joseph F. Long

[57] ABSTRACT

A washable coffee filter using a plastic membrane with a multiplicity of openings with a maximum diameter of less-than-20-microns for making a clear beverage by hot water extraction of finely ground coffee beans.

8 Claims, 1 Drawing Sheet

CONTROLLED PORE SIZE COFFEE FILTER

BACKGROUND OF THE INVENTION

There are a wide variety of ways that ground coffee beans are extracted with hot water to form the beverage called coffee. These range from boiling the ground coffee in the bottom of a pot to dripping hot water over the ground coffee contained in a paper filter. The amount of extraction of the ground coffee bean will depend upon how fine the bean is ground and hold up time of the hot water. In normal home use the hot water temperature will be essentially at the boiling point or close thereto.

Most people desire a clear coffee of a suitable "strength" and suitable taste while using a minimum amount of the ground coffee bean. Among the objectives of this invention are: 1) to produce a clear coffee of sufficient strength; 2) to allow use of a finely ground coffee bean to maximize extraction and minimize cost of the dry coffee; and 3) to have an easily washable re-usable unit.

All of the patents below are in the field of coffee making and would appear to have some similar objectives. The commonly used paper filters are closer in concept to the present invention than any of these patents. The paper filters do not, however, fill our objectives of making a clean coffee from finely ground coffee beans in an easily cleaned re-usable unit.

| Patent Number | Inventor | Date |
| --- | --- | --- |
| 3,266,441 | C. Oakley | 8/16/1966 |
| 2,370,096 | E. Walder, et al. | 8/20/1945 |
| 1,418,436 | E. S. Gardener | 6/6/1922 |
| 1,351,410 | W. H. Bruning | 8/31/1920 |

SUMMARY OF THE INVENTION

This invention comprises an easily washable permanent filter in the bottom of an open container and is designed to make maximum use of the finely ground coffee while making a clear coffee beverage. In order to fulfill these objectives the filter is made with sufficient number of pores or openings that are less-than-20-microns in diameter to allow a flow between 100 and 500 milliliters per minute when using a flat filter of approximately 4-½" in diameter.

In one preferred embodiment the less-than-20-micron filter is made with a plastic fluorocarbon membrane with controlled pore sized openings of less-than-20-microns supported on a plastic open grid in the bottom of an open cup-like container for the ground coffee beans. Hot water is dripped on the ground coffee beans and flows through the ground coffee beans and through the filter to the pot below. Since the openings in the filter are less-than-20-microns a finer than standard grind of coffee may be used. This finer grind results in greater extraction to make a suitable beverage using less of the coffee beans In a second embodiment the plastic membrane with less-than-20-micron openings is fused to a 40 mesh screen to form a filter to snap into the cup-like container for the ground coffee.

DESCRIPTION OF PREFERRED EMBODIMENTS OF THE INVENTION

A preferred embodiment of the invention uses a plastic membrane, recently available from W. L. Gore Co., Elkton, M.D., wherein a multiplicity of openings, all at a controlled diameter of less-than-20-microns may be integrally formed over an open support grid in a cup-like unit. This membrane is used as a filter in this open plastic cup-like unit with support legs so that the unit will be supported when placed into any one of a large number of different sized coffee pots. Normally coffee makers depend on gravity flow of hot water aspirated through a heater unit and dripped over the ground coffee to extract the taste producing compounds in the brewed coffee. A present widely used coffee maker heats and discharges the water over the ground coffee at a rate of about one cup per minute. The invention includes the minimum pore size in approximately a 4" diameter filter that will allow a gravity flow of a minimum of approximately 100 ml. minute, which is about one third of a cup per minute and also smaller pore size membranes for use with coffee makers wherein the coffee is brewed at lower rates. Rates as low as one-third cup per minute for household use are visualized. Larger diameter plastic membrane filters would be used for large volume coffee makers.

In a second embodiment, a plastic membrane with pore size of less-than-20-microns may also be used by fastening the plastic membrane over a support grid that snaps into the bottom of the open cup-like unit. Fastening could be by any of several means including a snap ring or simple sealing in the plastic.

Figure 1:
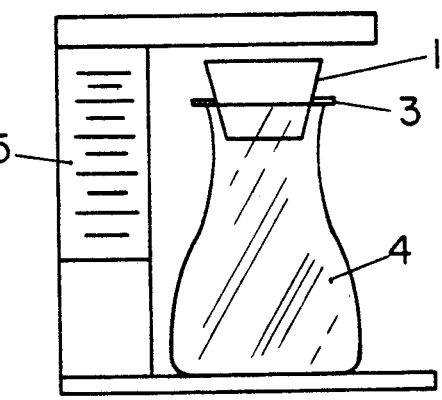
FIG. 1 shows the coffee filter unit 1 sitting in coffee pot 6 in a usual type coffee maker 7. Support legs 3 allow filter unit 1 to fit in most coffee makers of the type wherein hot water drips over the ground coffee.
Figure 2:
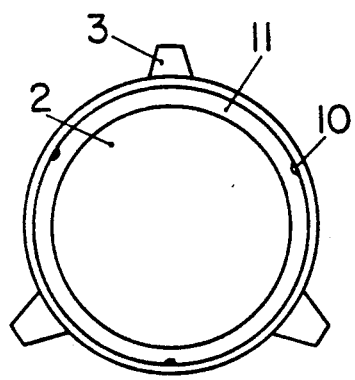
FIG. 2 shows a top view of filter unit 1 with support legs 3 and a porous plastic membrane 2 with uniform pore size openings of less-than-20-microns in the bottom of unit 1.
Figure 4:
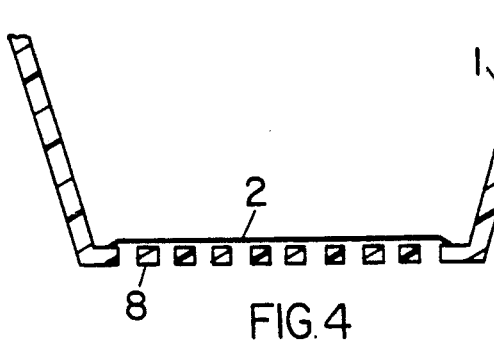
In FIG. 4 we show a detailed view of the filtering element wherein the porous plastic membrane 2 is fused to a plastic support grid 7 that is an integral part of the unit.

In the drawings, FIG. 1 shows one type of coffee maker 7 with the open cup-like unit 1 supported by support legs 3 in a coffee pot 6. FIG. 2 shows a top view of cup-like unit 1 with the controlled pore sized membrane 2 over a support grid. Lugs 4 would be visible in embodiments wherein the membrane 2 is fused to a snap-in support grid. In a embodiment wherein the cup-like unit 1 is formed with membrane 2 fused to a plastic grid 7 as shown in FIG. 4 these lugs would not be used.

Figure 3:
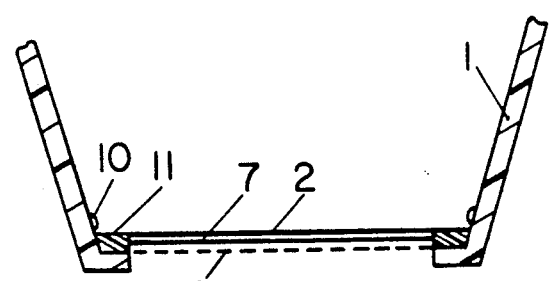
FIG. 3 shows a detailed view of membrane filter 2 fused to a stainless screen of a maximum of 40 mesh 6 which is connected to metal support grid 5 which may be either a heavier mesh screen or flat metal with closely spaced ¼" openings.
Figure 5:
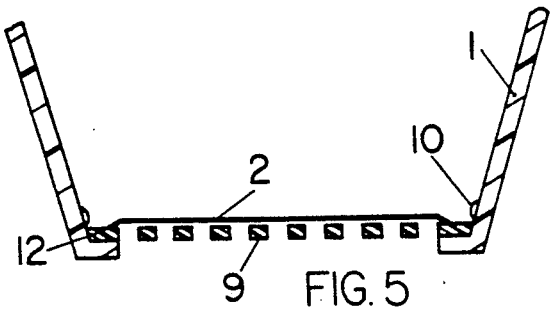
In FIG. 5 we show a side view wherein the plastic membrane 2 is fused to a snap-in plastic support grid 8.

In FIG. 3 we show a snap-in filtering unit wherein a metal plate with openings or a heavy mesh grid 5 is used to support a screen that may be finer than 40 mesh 6 with the controlled pore size membrane 2 fused or integrally formed on the screen 6. Another embodiment is shown in FIG. 5 wherein membrane 2 is fused to a snap-in plastic support grid 8.

What is claimed is:

1. A controlled pore size coffee filter comprising:
a) an open cup means with support means to hold said open cup means in the top of an open coffee pot;
b) a membrane filter means in the bottom of said open cup means with said membrane filter means having a multiplicity of openings with a maximum diameter of less-than-20- microns.

2. A controlled pore size coffee filter as in claim 1 wherein said membrane filter means snaps into a bottom of said open cup means.

3. A controlled pore size coffee filter as in claim 2 wherein said membrane filter means comprises a stainless support grid attached to a solid outer ring with a plastic membrane having a multiplicity of openings with a maximum diameter of less-than-20 microns fused to said stainless support grid.

4. A controlled pore size coffee filter as in claim 2 wherein said membrane filter means comprises a plastic support grid attached to a solid outer ring with a plastic membrane having a multiplicity of openings with a maximum diameter of less-than-20 microns fused to said plastic support grid.

5. A controlled pore size coffee filter as in claim 1 wherein said membrane filter means is a plastic supported membrane with a multiplicity of openings with a maximum diameter of less-than-20 microns and is sealed in the bottom of said open cup means.

6. A controlled pore size coffee filter as in claim 5 where said plastic supported membrane is a fluorocarbon polymer.

7. A controlled pore size coffee filter as in claim 1 wherein said membrane filter means is a plastic membrane having a multiplicity of openings with a maximum diameter of less-than-20 microns and is adhering to the top surface of an open support grid.

8. A controlled pore size coffee filter comprising:
a) an open cup means with support means to hold said open cup means in the top of an open coffee pot;
b) a membrane filter means in the bottom of said open cup means with uniform pore size openings with a maximum diameter of less-than-20 microns to permit gravity flow of a minimum of 100 ml. per minute when said membrane filter means is approximately four inches in diameter.

* * * * *